United States Patent [19]
Schliesman et al.

[11] Patent Number: 6,129,785
[45] Date of Patent: *Oct. 10, 2000

[54] LOW PH COATING COMPOSITION FOR INK JET RECORDING MEDIUM AND METHOD

[75] Inventors: Leonard J. Schliesman; Leland O. Tritz, both of Wisconsin Rapids; Karen K. Spreda, Plover, all of Wis.

[73] Assignee: Consolidated Papers, Inc., Wisconsin Rapids, Wis.

[ * ] Notice: This patent issued on a continued prosecution application filed under 37 CFR 1.53(d), and is subject to the twenty year patent term provisions of 35 U.S.C. 154(a)(2).

[21] Appl. No.: 08/874,166

[22] Filed: Jun. 13, 1997

[51] Int. Cl.$^7$ .................................................. C04B 14/04

[52] U.S. Cl. ............................................ 106/482; 106/491

[58] Field of Search ..................................... 106/482, 491

[56] References Cited

U.S. PATENT DOCUMENTS

| | | | |
|---|---|---|---|
| 3,615,549 | 10/1971 | Ohyama et al. | |
| 3,759,744 | 9/1973 | Schliesman et al. | 428/330 |
| 3,889,270 | 6/1975 | Hoffman et al. | 347/105 |
| 3,966,572 | 6/1976 | Carder | 428/429 |
| 4,102,845 | 7/1978 | Schroeder et al. | 524/276 |
| 4,151,666 | 5/1979 | Raphael et al. | 283/7 |
| 4,168,165 | 9/1979 | Kato et al. | 428/219 |
| 4,168,338 | 9/1979 | Kato et al. | 101/453 |
| 4,266,016 | 5/1981 | Date et al. | 430/527 |
| 4,330,605 | 5/1982 | Boston | 430/14 |
| 4,371,582 | 2/1983 | Sugiyama et al. | 428/341 |
| 4,446,174 | 5/1984 | Mackawa et al. | 427/261 |
| 4,460,637 | 7/1984 | Miyamoto et al. | 428/212 |
| 4,474,847 | 10/1984 | Schroder et al. | 428/323 |
| 4,474,850 | 10/1984 | Burwasser | 428/336 |
| 4,474,859 | 10/1984 | Oshima et al. | 428/481 |
| 4,478,910 | 10/1984 | Oshima et al. | 428/331 |
| 4,490,434 | 12/1984 | Oshima et al. | 428/341 |
| 4,542,059 | 9/1985 | Toganoh et al. | 428/141 |
| 4,642,654 | 2/1987 | Toganoh et al. | 346/1.1 |
| 4,732,786 | 3/1988 | Patterson et al. | 427/261 |
| 4,792,487 | 12/1988 | Schurbing et al. | 428/342 |
| 4,892,787 | 1/1990 | Kruse et al. | 428/331 |
| 4,900,620 | 2/1990 | Tokita et al. | 428/330 |
| 4,902,568 | 2/1990 | Morohoshi | 428/331 |
| 4,915,923 | 4/1990 | Ogawa et al. | 423/335 |
| 5,013,603 | 5/1991 | Ogawa et al. | 428/331 |
| 5,041,328 | 8/1991 | Akiya et al. | 428/212 |
| 5,057,570 | 10/1991 | Miller et al. | 524/503 |
| 5,213,873 | 5/1993 | Yasuda et al. | 428/195 |
| 5,266,397 | 11/1993 | Ogawa et al. | 428/323 |
| 5,270,103 | 12/1993 | Oliver et al. | 428/219 |
| 5,279,885 | 1/1994 | Ohmori et al. | 428/195 |
| 5,320,897 | 6/1994 | Kondo et al. | 428/195 |
| 5,437,925 | 8/1995 | Macaulay et al. | 428/331 |
| 5,459,502 | 10/1995 | Sakaki et al. | 347/100 |
| 5,472,757 | 12/1995 | Ogawa et al. | 428/40 |
| 5,478,631 | 12/1995 | Kawano et al. | 428/212 |
| 5,660,622 | 8/1997 | Nikoloff | 106/287.34 |
| 5,725,946 | 3/1998 | Fukushima et al. | 428/342 |
| 5,798,173 | 8/1998 | Momma et al. | 428/342 |
| 5,856,001 | 1/1999 | Okumura et al. | 428/331 |
| 5,882,388 | 3/1999 | Adair et al. | 106/31.6 |
| 5,882,755 | 3/1999 | Igarashi et al. | 428/418 |
| 5,928,787 | 7/1999 | Owatari et al. | 428/409 |

FOREIGN PATENT DOCUMENTS

| | | |
|---|---|---|
| 0199874 | 11/1986 | European Pat. Off. . |
| 00730976 | 6/1999 | European Pat. Off. . |
| 3151471 | 8/1982 | Germany . |
| 51-47340 | 12/1976 | Japan . |
| 52-74340 | 3/1977 | Japan . |
| 55-051583 | 4/1980 | Japan . |
| 55-51583 | 4/1980 | Japan . |
| 56-148583 | 11/1981 | Japan . |
| 56-148586 | 11/1981 | Japan . |
| 57-82085 | 5/1982 | Japan . |
| 57-107878 | 7/1982 | Japan . |
| 57-107879 | 7/1982 | Japan . |
| 56-042774 | 9/1982 | Japan . |
| 58-16884 | 1/1983 | Japan . |
| 56193458 | 6/1983 | Japan . |
| 58-134785 | 8/1983 | Japan . |

OTHER PUBLICATIONS

M. Takahashi, T. Sato & M. Ogawa, "Development of Amorphous Silica For Ink Jet Recording Paper", English Translation from Japan TAPPI, 42 (10), 23 (1990), Apr. 23, 1990.

Air Products' Polymer Chemicals Technical Bulletin Pub No. 152–9609, No Date.

Hercules' Hercon 70,72,75,76, and 78 Cationic Emulsions product brochure Dec. 1989.

BASF's Basoplat 335D Technical Information product brochure Feb. 1995.

Calgon's Paper Chemicals Products & Services Bulletin No. 29–218, Dec. 1992.

Kenite's Celite WPP Technical Bulletin No. 105, Jun. 1995.

Union Carbide's Polyox product brochure, No Date.

"Silica Pigments for Ink Jet Printability", Michael C. Withiam; presented at 1996 TAPPI Coating Conference Coating Roundtable, May 1996.

Kirk–Othmer Encyclopedia of Chemical Technology, Fourth Edition, vol. 21, Silica Gel, pp. 1020–1022, 1997. (No Month).

Air Products Bulletin #152–9607, "Airvol PVA Typical Properties", 1995 (No Month).

CIBA–GEIGY Technical Bulletin, "Flourescent Whitening Agents for Paper" (May 1995).

(List continued on next page.)

Primary Examiner—Helene Klemanski
Attorney, Agent, or Firm—Greer, Burns & Crain, Ltd.

[57] ABSTRACT

A coating composition for an ink jet recording medium comprises an aqueous suspension of absorptive silica pigment, a polyvinyl alcohol binder, and a cationic fixing agent. The composition is dispersed at pH values in the range of 4.0 to 7.0. The pigment is preferably a mixture of 75% or more silica gel having a pore volume of 0.5–1.5 cc/g, and 10% or more alumina or alumina hydrate. A method for making down the coating composition and applying it to a substrate is also disclosed.

22 Claims, No Drawings

OTHER PUBLICATIONS

Morton Waterbased Polymer Technical Bulletin, "Paper Chemicals, MSA–150 Surface Size" (No Date).

Davison Silica Gels Technical Bulletin, "Typical Chemical and Physical Properties of Silica Gel" (No Date).

Hercules Product Data, "Chromaset 600 Surface Sizing Treatment", HER.27167 Rev. 11–94.

SEQUA Chemicals, Technical Data, "Uniq–Print 8000" No Date.

M. Takahashi, T. Sato & M. Ogawa, "Development of Amorphous Silica for Ink Jet Recording Paper", English ZTranslation from Japan TAPPI, 42(10), 23 (1990), Apr. 23, 1990.

Air Products' polymer Chemicals Technical Bulletin Pub. No. 152–9609, No Date.

Hercules' Hercon 70,72,75,76, and 78 Cationic Emulsions product brochure, Dec. 19, 1989.

BASF's Basoplat 335D Technical Information product brochure, Fe. 1995.

Calgon's Paper Chemicals Products & Services Bulletin No. 29–218, Dec. 1992.

Kenite's Celite WPP Technical Bulletin No. 105, Jun. 1995.

Union Carbide's Polyox product brochure., No Date.

"Silica Pigmens for Ink Jet Printability", Michael C. Withiam; presented at 1996 TAPPI Coating Conference Coating Roundtable, May 1996.

Kirk–Othmer Encyclopedia of Chemical Technology, Fourth Edition, vol. 21, Silica Gel, pp. 1020–1022, 1997. No. Month.

Air Products Bulletin #152–9607, "Airvol PVA Typical Properties", 1995, (No Month).

CIBA–GEIGY Techncal Bulletin, "Flourescent Whitening Agents for Paper", May 1995.

Morton Waterbased Polymer Technical Bulletin, "Paper Chemicals, MSA–150 Surface Size", (No Date).

Davison Silica Gels Technical Bulletin, "Typical Chemical and Physical Properties of Silica Gel"(No Date).

Hercules Product Data, "Chromaset 600 Surface Sizing Treatment", HER.27167 Rev. 11–94.

SEQUA Chemicals, Technical Data, "Uniq–Print 8000", No date.

LOW PH COATING COMPOSITION FOR INK JET RECORDING MEDIUM AND METHOD

BACKGROUND OF THE INVENTION

This invention relates to a low pH coating composition for a recording medium especially adapted for ink jet printing, and method for making the same.

Ink jet printers employ a plurality of jets connected to a supply of liquid based ink. The jets have small openings and can be energized to emit uniform liquid droplets of ink in a continuous stream upon demand. The jets are controlled to print characters or images on a moving flat surface, usually a sheet of paper.

In order to improve print quality and drying time, many proposals have been made for coatings on paper to improve ink reception. For example, it is well known to coat paper with various absorptive pigments, binders and sizing agents. An aqueous suspension of these agents are applied to a paper or other web using conventional coating methods.

An ideal ink receiving coating on paper will allow rapid absorption of the liquid component of the ink, which correlates to a rapid ink drying time, while preventing diffusion of the ink colors into the paper substrate. At the same time, the coating should cause the ink pigment or dye to be fixed on the sheet surface in the form of well defined dots of uniform size and shape. The coating, upon drying, should be non-dusting and non-toxic. A correct balance of these properties is very difficult to achieve, especially at higher printer resolutions and smaller dot diameters.

While a variety of acceptable coatings can be devised in theory, it is also imperative for the sake of economy that the coatings are capable of being applied uniformly to a base sheet at a high rate of speed using conventional coating equipment. Many of the known absorptive pigments, such as those based on powdered forms of silica, cannot be employed because an excessive amount of binder is required for processing at the solids content necessary to achieve the desired minimum coat weight. The suspensions become too thick or dilatant to allow pumping and uniform application using a conventional paper coater such as a blade coater. If lower binder levels are employed, this may also result in excessive dusting in the finished product.

SUMMARY OF THE INVENTION

An ink receptive coating is applied to one or both sides of a substrate. The substrate may be optionally precoated with a size solution before the ink receptive coating is applied. The ink receptive coating is an aqueous suspension comprising silica pigment dispersed at low pH with a cationic fixing agent. Coatings with pH values of 4.0 to 7.5 have been found to give improved ink holdout over conventional coating compositions having pH values in the range of 8.0–9.0. The improved ink holdout results in better color saturation, reduced bleed through, and better overall print quality.

Silica gels are preferred pigments. Silica gels are commercially available that have acceptably low pH values and high void volumes desirable for ink absorption.

Cationized pigments hold more dye at the surface than anionic pigments. Accordingly, the coating composition of the invention preferably includes a cationic fixing agent, such as polycationic quaternary ammonium polymer, to cationize the pigment.

The coating composition of the invention includes a binder. Although several suitable binders could be used, low molecular weight, partially hydrolyzed polyvinyl alcohol is preferred.

Alumina may be added to the coating composition as a whitening agent and to improve rheology. For applications where an FDA approved coating is not required, a fluorescent whitening agent may be added.

Thus, broadly the coating composition of the invention has a pH value of 4.0 to 7.5, and comprises, by bone dry parts by weight:

| | |
|---|---|
| 50–100 | parts absorptive silica pigment |
| 0–50 | parts alumina |
| 30–50 | parts polyvinyl alcohol |
| 4–10 | parts cationic fixing agent |

The preferred embodiment comprises, approximately, in bone dry parts by weight:

| | |
|---|---|
| 75 | parts silica gel |
| 25 | parts alumina trihydrate |
| 40 | parts low molecular weight, partially hydrolyzed polyvinyl alcohol |
| 10 | parts polycationic quaternary ammonium polymer |
| 2 | parts fluorescent whitening agent |

The coated ink jet medium of the present invention allows ink jet printing over a wide range of resolution with precise control of dot size (freedom from print mottle), dot size uniformity, and dot shape.

DESCRIPTION OF THE PREFERRED EMBODIMENTS

The coating composition of the invention comprises an aqueous suspension of an absorptive silica pigment, a binder and a cationic fixing agent, dispersed at an acidic pH. Although the precise technical effect is not fully known, it is believed that the acidic pH of the coating composition enhances the cationic function. The coating composition of the invention is applied to a substrate, for example paper. When an ink jet ink is applied to the coated paper, the absorptive silica particles absorb the ink solvent (water) leaving the dyes on the surface of the particles, and the cationic agent assists in fixing the dye on the surface. This results in rapid dry time and improved ink hold out and color density.

The pH value of the composition is between 4.0 and 7.5, but preferably in the range of 4.5 to 5.5. Coatings at these pH values have been found to have improved holdout of the ink jet ink dyes on the paper surface as compared to conventional alkaline coating compositions having pH values of 8.0 to 9.0. The improved holdout results in enhanced color saturation and better overall print quality. It also reduces dye penetration to the opposite side of the sheet. The technical cause of the improvements observed in the low pH coating compositions of the invention is not precisely known, however.

Tests have been conducted on coating formulations of varying pH values. Coating compositions were prepared in accordance with the invention using pigments and binders selected to result in low pH values. Acid was added to lower pH values. A base, sodium hydroxide, was added to increase pH. It was found that when the pH of the composition is reduced to a value below about 4.0 the composition becomes unstable—the ingredients become less compatible and viscosity increases with time. As the pH is increased above about 5.5, to beyond a pH value of 7.5, the dispersion becomes similarly unstable, the viscosity of the composition becoming undesirably high. Accordingly, it has been found that a pH value in the range of about 4.5 to about 5.5 is preferable.

Silica type pigments are well suited for ink jet printing due to their high absorption properties. It is believed that absorptive silica particles act like a "molecular sieve," whereby the primary particle absorbs the aqueous ink medium, but holds the dye on the surface of the particle. This results in rapid dry time and improved ink hold out.

When evaluating the characteristics of voids in silica pigments, it is important to distinguish between primary particles, secondary or agglomerated particles and associated voids. The primary particles of some silicas agglomerate, that is, groups of primary particles cluster to form secondary particles. Other silicas lack agglomerates. Further, the structure of the primary particle may vary depending on the manufacturing process. Precipitated and gel processes produce porous primary particles, while the fumed silica process produces relatively small, glassy, non-porous particles. As a result, different void structures are created. Depending on the nature of the silica, there may be voids between secondary particles, voids between primary particles within the secondary particle structure, and voids within the primary particle. For purposes of the present application, the term "absorptive silica" means a silica where the primary particles are porous and capable of absorbing water. Also for the purposes of this application, the term "non-agglomerated" refers to a silica substantially free from agglomerates, i.e., the primary particles do not exhibit a tendency to cluster into secondary particles. Gel silicas are preferred as non-agglomerated, absorptive silicas, but some precipitated and hybrid silicas may also be non-agglomerated and absorptive. Generally, fumed silicas agglomerate and are not absorptive. For a further discussion of the properties of silica minerals see Withiam, Michael C., *Silica Pigments for Ink Jet Printing*, article presented at 1996 TAPPI Coating Conference, Nashville, Tenn., May 21, 1996. Precipitated silicas, calcium silicates and diatomaceous earths also have good absorption capabilities, but aqueous dispersions thereof have pH values that normally range 7.0 to 9.5.

Silica gels are preferred. When dispersed, silica gels have pH values range from 3.5 to 11.0, but many are in the 4.5 to 5.5 range. The physical properties of commercially available silica gels are as follows:

| Surface Area | 150→900 m$^2$/g |
|---|---|
| Pore Volume | 0.4→2.2 cc/g |
| Oil Absorption | 35→300 g/100 g |
| pH | 3.5→11.5 |
| Average Particle Size | 2 μ→17 μ |

Ink jet print quality and coating rheology require a special set of properties. Silicas with high surface areas, above 400 m$^2$/g are desiccants. Desiccants are unacceptable because they will absorb moisture from the air thereby reducing ink absorptive capacity. Silica gels with low pore volumes, less than 0.5 cc/g, are undesirable, as they exhibit insufficient water absorption capacity. High pore volumes are desirable for water absorption capacity, but volumes above about 2.0 cc/g give excessively high coating viscosities. Also, larger particle sizes are preferred for having high pore volume, but particle sizes greater than 16μ can give poor coating rheologies. Thus, the preferred properties of the silica pigment in the coating composition of the invention are as follows:

| Surface Area | 340 m$^2$/g |
|---|---|
| Pore Volume | 1.2 cc/g |
| Oil Absorption | 180 g/100 g |
| pH | 4.5–5.5 |
| Particle Size | 10–12 μ |

One such pigment is Syloid 620 from Grace Davison, W. R. Grace & Co., Connecticut.

It has been found that cationized pigments hold more dye at the surface than anionic pigments. Cationic fixing agents are effective at low pH conditions, but become less effective at alkaline pH values. The type of cationic fixing agent is not critical as long as it is compatible with the other coating ingredients. The fixing agent must be effective at concentrating the dyes at the coated surface, provide satisfactory runability on a blade coater, and not adversely affect brightness. Suitable fixing agents include acrylamideacrylic polymers and their derivatives, polyamines and their derivatives, poly(ethylene oxide), and allylamine polymers. Preferably, the cationic fixing agent is a water soluble polymer having a high percentage of cationic groups such as tertiary amino or quaternary ammonium cationic groups. Water soluble, polycationic quaternary ammonium polymer (polydimethyldiallyl-ammonium chloride) is preferred in the formulation of the invention because the level of the agent may be varied substantially without flocculating the other coating ingredients. An example of this product is Lectrapel, marketed by Calgon Corporation, Water Management Division, Pittsburgh, Pa. The cationic fixing agent is added in an amount of from about 4 to about 10 bone dry parts by weight per 100 parts of pigment.

Polyvinyl alcohol (PVOH) is an acceptable binder for the coating formulation of the invention. Starches and latexes are also suitable binders and could provide satisfactory strength. Latex binders may be advantageously used in combination with polyvinyl alcohol. Some latex binders are incompatible with cationic fixing agents, however. Accordingly, if a cationic fixing agent is used, one must select a compatible latex. Also, many starches have lower binding strength than PVOH and would require excessive levels of use.

Many polyvinyl alcohols can be used, including low and medium molecular weight, partially and fully hydrolyzed. Fully hydrolyzed products are too water insoluble and give long ink dry times. Medium molecular weight products give excessive viscosities and poor rheologies. Thus, the preferred polyvinyl alcohols are low molecular weight, partially hydrolyzed. One such product is Airvol 805 from Air Products and Chemicals, Inc., Allentown, Pa.

A bright coating and one that is FDA approved for food packaging uses is desirable. Fluorescent whitening agents cannot be used for food packaging applications because they are not FDA approved. Alumina pigments are FDA approved, and are well suited whitening agents for the coating formulation of the invention. For the purposes of this application, the term "alumina" is used broadly to include aluminum oxide [$Al_2O_3$], aluminum trihydrate [$Al(OH)_3$] and other conventional aluminum containing pigments. These pigments also provide some alkalinity, which is desirable for use with alkaline-stabilized ink jet dyes. Alumina pigments can be stable at both cationic and low pH conditions. Several pigments would work in the formulation, but a dry alumina that can be added directly to the coating formulation of the invention and readily dispersed in it is preferred. One such product is Martifin OL-107 marketed by Martinswerk GmbH, Bergheim, Germany. The Martifin pigment readily disperses in the coating and is compatible with the other coating ingredients. The Martifin pigment, while increasing coating solids, improves rheology at the same time. Thus, inclusion of this pigment allows application by blade coater and achieves desirable coat weights of approximately 13 g/m² at 35% solids. This pigment also provides an acceptable brightness of 87 in a coating without fluorescent whitening agents.

For grades not requiring FDA approval, it is desirable to add a fluorescent whitening agent to the coating to increase the whiteness, brightness and blue color. While most fluorescent whitening agents would work to a certain degree, they must be stable in acid conditions and must be tolerant of the cationic coating to give optimum results. Most fluorescent whitening agents do not fall into this category. Two products, however, that do are from the Stilbene-Triazine derivatives family. Products of this type are Ciba-Geigy's Tinopal HST and SCP liquids, available from Ciba-Geigy, Paper Dyes and Chemicals, Greensboro, N.C.

To achieve the desired coating properties and ink jet quality the coating composition is preferably made down with the following order of addition:

| Bone Dry Weight | Material | Wet Weight |
|---|---|---|
|  | Water | 38.0 |
| 10.0 | Cationic fixing agent @ 40% solids | 25.0 |
| 30.0 | Polyvinyl alcohol @ 15% solids | 200.0 |
| 25.0 | Alumina @ 100% solids | 25.0 |
| 75.0 | Silica pigment @ 97% solids | 77.0 |
| 10.0 | Polyvinyl alcohol @ 15% solids | 67.0 |
| 2.0[1] | Fluorescent whitening agent | 2.0 |

[1]For the fluorescent whitening agent, the two parts listed are parts in liquid form as received from the supplier.

If polyvinyl alcohol (PVOH) is the desired binder, it must be dispersed before beginning the make down process. Preferably, the polyvinyl alcohol is cooked at 15% solids in water for 30 minutes at 95° C. This cooking process completely disperses the polyvinyl alcohol in the water.

In the first make down step, the water for dispersion, the cationic fixing agent and cooked polyvinyl alcohol at 15% solids are added to the make down vessel. Disperser speed is then increased to add sufficient shear to disperse the alumina pigment. The disperser can be of any of the normal dispersing blades such as Cowles or Gaulin. Alumina can be rapidly added to the coating as the pigment is readily dispersed.

After dispersing the alumina pigment for 10 minutes, the silica pigment is then added. The silica pigment must be added slowly into the vortex so it can be completely wetted out and dispersed before additional pigment is added. The disperser speed must be high enough to support a vortex into which the silica is added. Silica pigment added anywhere else but into the vortex will build-up on the tank wall and harden. It will not be properly dispersed. Both the cationic agent and silica pigment should be added at the indicated points of addition. If not, the coating could have excessively high viscosities or incompatibilities and grit could result.

After the silica pigment addition is complete, the remaining polyvinyl alcohol and any additives, e.g., a fluorescent whitening agent are added. The coating is then dispersed for an additional 10–20 minutes depending on volume. The coating composition is then ready for use.

The solids content of the coating composition suspension should be above 25%, and preferably above 30% to achieve weight of at least 7.3 g/m² with conventional coating equipment. Desirably, the percent solids should be as high as possible to reduce the energy needed to dry the coating composition on the substrate. It has been found that above about 38% solids the coating composition of the invention is difficult to smoothly apply with conventional equipment. Solids contents of 35–38% provides desirable coat weights of about 13 g/m².

The ink jet recording medium of the present invention comprises a substrate with the coating composition of the invention applied thereto. The substrate may comprise a variety of types of paper webs or, plastic substrates such as mylar. Paper webs may include groundwood-free sheets, groundwood sheets or a combination thereof. The basis weight of acceptable paper substrates may vary greatly, from very light Bible papers having basis weight of about 32 g/m² to heavy, specialty papers having basis weight of 450 g/m² or more. Paper substrates may be uncoated, size press coated or precoated, and the paper may be machine-glazed or machine finished. Depending on the nature of the substrate, a precoating or other treatment may be useful to reduce porosity, or to provide a better bonding surface for the subsequent coating, or to better prevent migration of the subsequent coating into the web. Preferably, rosin or other sizing is added to achieve 40 or less g/m²/min Cobb sizing, to reduce penetration of liquid into the web.

One or both sides of the paper web may be precoated with size solution to provide brightness and color and to provide sufficient holdout for the final coating. The precoating is applied in a conventional manner and may contain conventional pigments, binders and sizing agents. Preferably, the TAPPI brightness is 85 or greater, and the TAPPI "b" color is equal to or less than 2. If the subsequently applied ink-receiving coat will be applied to only one side of the web, a lightweight coating may also be applied to the other side of the web to minimize potential sheet curl.

The precoat comprises conventional pigments such as clay, titanium dioxide, calcium carbonate and others well known to those skilled in the art. The binders may comprise starch, soy protein, latex and the like. A sizing agent may be employed such as rosin, starch and other known sizing agents. The base web is preferably sized at values less than 40 g/m²/min Cobb size, and the coat weight is in the order of about 3.2 to about 8.1 g/m². Cobb size is a standard test to determine the amount of water absorbed during contact with the web and is measured in grams per square meter per minute.

A preferred substrate for cut size ink jet papers comprises a low ash base stock made square (having similar CD and MD physical properties), having a basis weight of between 74–119 g/m². The base stock is size coated with a light starch and pigment coating and dried prior to application of the ink receptive coating.

A preferred substrate suitable for ink jet label paper comprises 48–65 g/m² base stock with a wet strength resin in the base sheet to prevent cockle. The machine-glazed side of the sheet is coated with a pigment latex coating for curl control. The ink receptive coating is applied to the back side of the sheet.

After the web has been dried, the ink receptive coating of the invention is preferably applied over at least one side using a conventional coater, and then is dried. The desired coat weight is at least 7.3 g/m² and preferably 8–16.5 g/m². If the weight is significantly below 7.3 g/m², the resulting paper will exhibit less than desirable print quality and excessive ink penetration. After drying, the ink receptive coating layer will have a thickness of at least $8\mu$ and preferably from about 8 to about $12\mu$. The pigments in the coating provide an absorptive capacity for the liquid component of the ink to be applied, and the thickness of the coating layer is correlated to the absorption rate and hence ink drying time.

Depending on resolution of the printer, the size of the dots to be printed ranges in the order of 75 to $160\mu$. Ink jet printing of 1000 to 1200 dots per inch, when available, will require dots having a diameter of down to $40\mu$ or less. The present invention contemplates the use of various binders and sizing agents, depending on the resolution needed for a printer. The binder level and sizing agents contribute to the control of dot diameter and other properties.

In further illustration of the present invention, the following examples are presented. "Parts" in each example refer to bone dry parts by weight, except for the fluorescent whitening agent which is parts in liquid form as received from the supplier.

EXAMPLE A

A 52 pound (77 g/m$^2$) precoated, groundwood-free paper was used as the base sheet. The base sheet was coated using a conventional blade coater at a coat weight of 11.5 g/m$^2$ on both the wire and felt sides. The following coating composition was made down at 35% solids at a pH value of 5.3:

| Bone Dry Parts | Materials |
| --- | --- |
| 75 | Grace-Davison Syloid 620 silica gel |
| 25 | Martifin OL-107 alumina trihydrate |
| 40 | Airvol 805 low molecular weight, partially hydrolyzed polyvinyl alcohol |
| 10 | Lectrapel cationic agent (polycationic quaternary ammonium polymer) |

The dried sheet was then tested, the results being:

|  | Wire Side | Felt Side | Qualitative Analysis |
| --- | --- | --- | --- |
| Coatweight (g/m$^2$) | 11.5 | 11.5 |  |
| Basis Weight (g/m$^2$) | 103 | 103 |  |
| % Moist. Content | 4.9 | 4.9 |  |
| Smoothness |  |  |  |
| PrintSurf | 7.91 | 7.89 | (acceptable) |
| Hagerty | 221 | 224 | (acceptable) |
| Opticals |  |  |  |
| Brightness | 93.6 | 93.4 | (very good) |
| Lightness | 94.7 | 94.9 | (very good) |
| "a" | 2.2 | 2.0 | (good, slight red tint) |
| "b" | −3.1 | −2.9 | (good, slight blue tint) |
| FWA Contribution | 7.0 | 6.6 | (very good) |
| Strength |  |  |  |
| Tape Pull | 4.5 | 4.5 | (excellent) |
| Scratch | 5 | 5 | (excellent) |
| Coefficient of Friction |  |  |  |
| Static | 0.92 | 0.87 | (acceptable) |
| Kinetic | 0.50 | 0.59 | (good) |

|  | Wire Side | Felt Side | Qualitative Analysis |
| --- | --- | --- | --- |
| Epson Stylus Print Tests |  |  |  |
| Intensity | 8 | 8 | (very good) |
| Half-Tone Mottle | 8 | 9 | (very good) |
| Total | 16 | 17 | (very good) |
| Average Density | 1.56 | 1.55 | (excellent) |
| Hewlett Packard Print Tests |  |  |  |
| Ink Dry Time | 33 | 0 | (very good) |
| Mottle | 3 | 3 | (very good) |
| Pigment Black | 2 | 2 | (good) |

EXAMPLE B

A precoated, 43 pound (63.6 g/m$^2$) groundwood-free sheet was used as the base sheet. This base sheet was then coated on both the wire and felt sides with an ink receptive coating formulation at 9.6 g/m$^2$. The following coating composition was made down at 27.4% solids at a pH value of 4.3:

| Parts | Materials |
| --- | --- |
| 75 | Grace-Davison Syloid 620 silica gel |
| 25 | Martifin OL-107 alumina trihydrate |
| 40 | Airvol 823 medium molecular weight, partially hydrolyzed polyvinyl alcohol |
| 10 | Lectrapel cationic agent (polycationic quaternary ammonium polymer) |

After drying, the coated paper was cut to 8.5 by 11 inch sheets and print tested. The printers used were a Hewlett Packard 560C and an Epson Stylus ink jet printers. Both printers utilize four colors of inks (black, yellow, magenta and cyan). The results were:

|  | Wire | Felt |
| --- | --- | --- |
| HP Prints |  |  |
| 4-Color Black Density | 1.28 | 1.25 |
| Drytime (sec) | 97 | 107 |
| Pigmented Black | Good | Good |
| 4-Color Mottle | Good | Good |
| Epson Prints |  |  |
| Mottle | 8 | 8 |
| Intensity | 8 | 8 |
| Overall Print Quality | 16 | 16 |

The results show excellent four color print quality in both the Hewlett Packard and Epson printers. Ink dry times, however, were long.

EXAMPLE C

An ink receptive coating was applied at 10.4 g/m$^2$ to the wire side of 62 pound (92 g/m$^2$) precoated groundwood-free base sheet. The following ink receptive coating was made down at 28% solids and a pH value of about 4.3.

| Parts | Material |
|---|---|
| 85 | Grace-Davison Syloid 812–17 μ ("C") |
| 15 | Martoxin GL3 Alumina |
| 40 | Airvol 823 medium molecular weight, partially hydrolyzed polyvinyl alcohol |
| 6 | Lectrapel cationic fixing agent |

EXAMPLE D

Ink receptive coating was applied by an applicator roll, inverted blade coater at 11.5 g/m² to both sides of a 52 pound (77 g/m²) precoated, groundwood-free sheet. The following ink receptive coating was made down at 34.9% solids and a pH value of 5.5. The ink receptive coating comprised:

| Parts | Material |
|---|---|
| 75 | Grace Syloid 620 silica gel |
| 25 | Martifin OL-107 alumina trihydrate |
| 50 | Airvol 805 low molecular weight, partially hydrolyzed polyvinyl alcohol |
| 10 | Lectrapel cationic fixing agent |
| 2 | Tinopal HST fluorescent whitening agent |

EXAMPLE E

An ink receptive coating was applied by a laboratory blade coater at 11.4 g/m² to both sides of a 62 pound (92 g/m²) precoated, groundwood-free base sheet. The following ink receptive coating was made down at 36.0% solids and a pH value of 5.6, and was maintained at temperatures below 100° F.:

| Parts | Material |
|---|---|
| 75 | Grace Syloid 620 silica gel |
| 25 | Martifin OL-107 alumina trihydrate |
| 40 | Airvol 805 low molecular weight, partially hydrolyzed polyvinyl alcohol |
| 20 | XU 31294.5 latex binder |
| 10 | Lectrapel cationic fixing agent |
| 2 | Tinopal HST fluorescent whitening agent |

EXAMPLE F

As ink receptive coating was applied by a bench blade coater at 13.0 g/m² to the back side of 42 pound (68.2 g/m²) coated two side, machine-glazed paper substrate. The ink receptive coating was made down at 34.9% solids and a pH value of 4.8 with the following components:

| Parts | Material |
|---|---|
| 100 | Grace Davison Syloid 63 silica gel particle size 5–7 μ pore volume 0.5 cc/g |
| 25 | Airvol 823, medium molecular weight, partially hydrolyzed polyvinyl alcohol |
| 6 | Lectrapel cationic fixing agent |

Print tests conducted on an Epson Stylus ink jet printer indicated good mottle rating of 8.5 out of a possible 9.0 and an acceptable color saturation rating 6.0 out of a possible 8.0, for a combined rating of 14.5.

EXAMPLE G

The same substrate as in Example F was coated at 13.0 g/m² with a coating at 28.6% solids and a pH value of 4.5 with the following components:

| Parts | Material |
|---|---|
| 100 | Grace-Davison Syloid 620 silica gel particle size 10–12 μ pore volume 1.2 cc/g |
| 35 | Airvol 823, medium molecular weight, partially hydrolyzed polyvinyl alcohol |
| 6 | Lectrapel cationic fixing agent |

Print tests on an Epson Stylus ink jet printer indicated a good mottle rating of 8.5 out of a possible 9 and a good color saturation rating of 7.0 out of a possible 8.0, for a combined rating of 15.5.

EXAMPLE H the same substrate as in Example F was coated at 13 g/m² with a coating composition at 22.5% solids and a pH value of 4.6 having the following components:

| Parts | Material |
|---|---|
| 100 | Grace-Davison Syloid 812, 15 μ silica gel particle size 15 μ pore volume 2.1 cc/g |
| 50 | Airvol 823, medium molecular weight, partially hydrolyzed polyvinyl alcohol |
| 6 | Lectrapel cationic fixing agent |

Print tests on an Epson Stylus ink jet printer indicated a good mottle rating of 8.5 out of a possible 9 and a good color saturation rating of 7.0 out of a possible 8.0, for a combined rating of 15.5.

EXAMPLE I

The same substrate as in Example F was coated at 13 g/m² with the following coating composition at 22.9% solids with a pH value of 4.6 having the following components:

| Parts | Material |
|---|---|
| 100 | Grace-Davison Syloid 812, 17 μ silica gel particle size 17 μ pore volume 2.1 cc/g |
| 50 | Airvol 823, medium molecular weight, partially hydrolyzed polyvinyl alcohol |
| 6 | Lectrapel cationic fixing agent |

Print tests on an Epson Stylus ink jet printer indicated a good mottle rating of 8.5 out of a possible 9 and an excellent color saturation rating of 7.5 out of a possible 8.0, for a combined rating of 16.0.

EXAMPLE J

An ink receptive coating was applied by a laboratory bench blade coater at 12.2 g/m² to a 62 pound (100 g/m²)

precoated, groundwood-free base sheet. The ink receptive coating composition was prepared at 35% solids and a pH value of 5.4 as follows:

| Parts | Material |
|---|---|
| 75 | Grace-Davison Syloid 620 silica gel |
| 25 | Martifin OL-107 alumina trihydrate |
| 50 | Airvol 805 low molecular weight, partially hydrolyzed polyvinyl alcohol |
| 6 | Lectrapel cationic fixing agent |

EXAMPLE K

Example J was repeated, with the coating composition as follows:

| Parts | Material |
|---|---|
| 75 | Grace-Davison Syloid 620 silica gel |
| 25 | Martifin OL-107 alumina trihydrate |
| 40 | Airvol 805 low molecular weight, partially hydrolyzed polyvinyl alcohol |
| 6 | Lectrapel cationic fixing agent |

EXAMPLE L

Example J was repeated, with the coating composition as follows:

| Parts | Material |
|---|---|
| 75 | Grace-Davison Syloid 620 silica gel |
| 25 | Martifin OL-107 alumina trihydrate |
| 30 | Airvol 805 low molecular weight, partially hydrolyzed polyvinyl alcohol |
| 6 | Lectrapel cationic fixing agent |

EXAMPLE M

An ink receptive coating was applied by a laboratory bench blade coater to the same base sheet as in Examples J through L. The ink receptive coating composition was prepared at 38% solids and a pH value of 5.6 as follows:

| Parts | Material |
|---|---|
| 75 | Grace-Davison Syloid 620 silica gel |
| 25 | Martifin OL-107 alumina trihydrate |
| 40 | Airvol 805 low molecular weight, partially hydrolyzed polyvinyl alcohol |
| 4 | Lectrapel cationic fixing agent |

EXAMPLE N

Example M was repeated, with the coating composition as follows:

| Parts | Material |
|---|---|
| 75 | Grace-Davison Syloid 620 silica gel |
| 25 | Martifin OL-107 alumina trihydrate |
| 40 | Airvol 805 low molecular weight, partially hydrolyzed polyvinyl alcohol |
| 6 | Lectrapel cationic fixing agent |

EXAMPLE O

Example M was repeated, with the coating composition as follows:

| Parts | Material |
|---|---|
| 75 | Grace-Davison Syloid 620 silica gel |
| 25 | Martifin OL-107 alumina trihydrate |
| 40 | Airvol 805 low molecular weight, partially hydrolyzed polyvinyl alcohol |
| 10 | Lectrapel cationic fixing agent |

EXAMPLE P

An ink receptive coating was applied by a laboratory bench blade coater to the same base sheet as in Examples J through O. The ink receptive coating composition was prepared at 35% solids and a pH value of 5.6 as follows:

| Parts | Material |
|---|---|
| 75 | Grace-Davison Syloid 620 silica gel |
| 25 | Martifin OL-107 alumina trihydrate |
| 40 | Airvol 805 low molecular weight, partially hydrolyzed polyvinyl alcohol |
| 4 | Lectrapel cationic fixing agent |

EXAMPLE Q

Example P was repeated, with the coating composition as follows:

| Parts | Material |
|---|---|
| 75 | Grace-Davison Syloid 620 silica gel |
| 25 | Martifin OL-107 alumina trihydrate |
| 40 | Airvol 805 low molecular weight, partially hydrolyzed polyvinyl alcohol |
| 6 | Lectrapel cationic fixing agent |

EXAMPLE R

Example P was repeated, with the coating composition as follows:

| Parts | Material |
|---|---|
| 75 | Grace-Davison Syloid 620 silica gel |
| 25 | Martifin OL-107 alumina trihydrate |

-continued

| Parts | Material |
|---|---|
| 40 | Airvol 805 low molecular weight, partially hydrolyzed polyvinyl alcohol |
| 10 | Lectrapel cationic fixing agent |

EXAMPLE S

An ink receptive coating was applied by a laboratory bench blade coater to the same base sheet as in Examples J through R. The ink receptive coating composition was prepared at 35% solids and a pH value of 5.6 as follows:

| Parts | Material |
|---|---|
| 90 | Grace-Davison Syloid 620 silica gel |
| 10 | Martifin OL-107 alumina trihydrate |
| 40 | Airvol 805 low molecular weight, partially hydrolyzed polyvinyl alcohol |
| 4 | Lectrapel cationic fixing agent |

EXAMPLE T

Example S was repeated, with the coating composition as follows:

| Parts | Material |
|---|---|
| 90 | Grace-Davison Syloid 620 silica gel |
| 10 | Martifin OL-107 alumina trihydrate |
| 40 | Airvol 805 low molecular weight, partially hydrolyzed polyvinyl alcohol |
| 6 | Lectrapel cationic fixing agent |

EXAMPLE U

Example S was repeated, with the coating composition as follows:

| Parts | Material |
|---|---|
| 90 | Grace-Davison Syloid 620 silica gel |
| 10 | Martifin OL-107 alumina trihydrate |
| 40 | Airvol 805 low molecular weight, partially hydrolyzed polyvinyl alcohol |
| 10 | Lectrapel cationic fixing agent |

Each of the Examples J–U were tested for print quality and other factors. The results are shown in table 1. An explanation of each rating follows the table. Examples J–L were tested to explore different binder levels. The strength tests of tape pull and scratch resistance were evaluated. The results reveal that 30 parts of Airvol 805 polyvinyl alcohol binder (Example L) is at the point of unacceptable strength, 50 parts is higher than needed (Example J), while 40 parts provides acceptable to good results (Example K).

Examples M–O, P–R and S–U were tested to evaluate the level of cationic fixing agent, in this case, Letrapel. Examples M–O were conducted at 38% solids, while P–R were conducted at 35% solids. Examples S–U were tested with a different mixture of pigments. In these three series of tests, print quality was evaluated. The tests showed increasing the level of cationic fixing agent consistently improved print quality and strength, see in particular the increasing average density test results. Ten parts of Lectrapel fixing agent per 100 parts of pigment is optimum. Above 10 parts, it is believed that the coating composition becomes too chemically interactive, developing viscosity changes over time that cannot be controlled. It is also noted that higher levels of Lectrapel extends ink dry times.

Comparing Examples M–O with Examples P–R shows the effect of the solids content. In particular the lower solids formulation used in Examples P–R showed consistently better ink dry times.

Examples P–R as compared to Examples S–U shows the effects of the pigment mixture. Examples P–R are 75/25 ratio of silica/alumina while Examples S–U are a 90/10 ratio. The 75/25 ratio exhibited consistently better strength and rheology. The 90/10 ratio gave slightly better print quality and faster ink dry times.

TABLE 1

| Example | J | K | L | M | N | O | P | Q | R | S | T | U |
|---|---|---|---|---|---|---|---|---|---|---|---|---|
| Formulation | | | | | | | | | | | | |
| Syloid 620 | | 75 | | | 75 | | | 75 | | | 90 | |
| Martifin OL-107 | | 25 | | | 25 | | | 25 | | | 10 | |
| Airvol 805 | 50 | 40 | 30 | | 40 | | | 40 | | | 40 | |
| Lectrapel | | 6 | | 4 | 6 | 10 | 4 | 6 | 10 | 4 | 6 | 10 |
| pH Value | 5.4 | 5.4 | 5.4 | 5.6 | 5.4 | 5.2 | 5.6 | 5.4 | 5.6 | 5.6 | 5.5 | 5.2 |
| Application solids | | 35% | | | 38% | | | 35% | | | 35% | |
| Smoothness | | | | | | | | | | | | |
| PrintSurf | 8.19 | 8.10 | 7.96 | 8.21 | 8.20 | 8.22 | 8.04 | 8.03 | 8.07 | 7.92 | 7.92 | 7.98 |
| Hagerty Strength | 301 | 274 | 248 | 266 | 272 | 278 | 265 | 270 | 283 | 263 | 270 | 278 |
| TapePull | 5 | 2 | 1 | 2 | 4 | 5 | 1 | 2.5 | 4 | 0 | 1 | 3 |
| Scratch Resistance Epson Stylus | 5 | 4 | 2 | 3.5 | 3.5 | 4 | 3 | 3.5 | 4.5 | 1.5 | 1 | 1.5 |
| Intensity | 8 | 7 | 6 | 8 | 8 | 8+ | 7 | 7 | 7 | 7 | 7 | 7 |

TABLE 1-continued

| Example | J | K | L | M | N | O | P | Q | R | S | T | U |
|---|---|---|---|---|---|---|---|---|---|---|---|---|
| HTM | 8 | 8 | 9 | 8 | 8 | 8 | 8 | 8 | 8 | 8 | 8 | 8 |
| Total | 16 | 15 | 15 | 16 | 16 | 16+ | 15 | 15 | 15 | 15 | 15 | 15 |
| Ave Density[1] Hewlett Packard | 1.56 | 1.50 | 1.40 | 1.50 | 1.53 | 1.55 | 1.46 | 1.49 | 1.53 | 1.51 | 1.52 | 1.58 |
| Ink Dry Time, Sec. | 80 | 21 | 0 | 40 | 51 | 96 | 16 | 33 | 78 | 0 | 0 | 25 |
| Mottle | 2 | 1 | 1 | 1 | 1 | 2 | 2 | 1 | 2 | 2 | 2 | 1 |
| Pigment Black | 1 | 1 | 2 | 1.5 | 1 | 1 | 1 | 1 | 1 | 2 | 2 | 1 |
| Rheology[2] | 12.1 | 8.9 | 6.3 | 16.0 | 17.9 | 19.9 | 8.6 | 8.9 | 11.9 | 11.3 | 11.7 | 14.2 |

[1]Average of six density readings: 2 Magenta, 2 red, 2 black
[2]Average torque $400^{-1\ sec}$

GLOSSARY OF TERMS

Mottle
  HP Print: Non-uniformity of ink density in the solid print areas. Rating 1 to 3 with three having little or no mottle.
  Epson: Non-uniformity of ink density in specific half-tone areas. Ratings 1 to 9 with nine being best.
Pigment Black Bleed
  A general increase in printed line width.
  HP ratings 1 to 3 with three being best and having little or no increase.
  Epson: Okay or poor as observed.
Ink Penetration
  The degree to which ink dye penetrates into and through the sheet.
  Okay or poor as observed.
Cockle
  The degree to which the sheet will deviate from its original shape upon printing or having other liquid applied to it.
  Okay or poor as observed.
Scratch resistance
  The degree to which coating comes off the sheet when scratched with the fingernail.
  Ratings 1 to 5 with five being best and there being no removal of coating.
Tape Pull
  A measure of the amount of coating which separates from the fiber and adheres to cellophane tape when tape is pressed on then slowly pulled off at right angles to the sheet. Rating 1 to 5 with five being best and there being no removal of coating from the fibers.
Dusting
  The degree to which coating will come off the sheet when rubbed with the tip of the finger. Okay or poor as observed.

EXAMPLE V

A coating composition of the same formula as in Example A was prepared. Sodium hydroxide (NaOH) was added to a portion of the sample to raise the pH value to 7.5. The coating was applied with a laboratory blade coater at 12.2 g/m² to the wire side a 62 pound (92 g/m²) precoated, groundwood-free base sheet. After drying, the paper was print tested. The print quality was comparable to a sample having a pH of about 5.3, but the ink dry time for the 7.5 pH sample was about 50% longer than the 5.3 pH sample.

EXAMPLE W

An ink receptive coating was applied by a laboratory bench blade coater at 12.2 g/m² to a 62 pound (92 g/m²) precoated, groundwood-free base sheet. The ink receptive coating was prepared at 32.7% solids and a pH value of 5.2, as follows:

| Parts | Material |
|---|---|
| 60 | Grace Davison Sylojet C silica gel 17 μ particle size 2.1 pore volume |
| 40 | Martifin OL-107 alumina trihydrate |
| 40 | Airvol 805 low molecular weight, partially hydrolyzed polyvinyl alcohol |
| 10 | Lectrapel cationic fixing agent |
| 2 | Tinopal HST fluorescent whitening agent |
| 0.11 | NaOH @ 20% |

EXAMPLE X

An ink receptive coating was prepared as in Example W, except that the pigment mix was varied to 50 parts of Sylojet C and 50 parts of Martifin OL-107. The pH value was 5.3.

The Example W and X samples had comparable, acceptable print test results. Some adverse bleeding of the pigment black was noted. Example X had a longer drying time, undoubtably due to the lower level of silica gel. The coating layer strength as measured by the tape pull and scratch resistance tests were very low in both Examples W and X.

EXAMPLE Y

An ink receptive coating was applied by a laboratory bench blade coater at 10.5 g/m² to a 62 pound (92 g/m²) precoated groundwood-free base sheet. The coating composition was prepared at 27.5% solids and a pH of 4.3 as follows:

| Parts | Material |
|---|---|
| 75 | Grace Davison Sylojet C silica gel 17 μ particle size 2.1 pore volume |
| 25 | Martifin OL-107 alumina trihydrate |
| 20 | Airvol 823 medium molecular weight, partially hydrolyzed polyvinyl alcohol |
| 20 | Elvanol 9050 medium molecular weight, fully hydrolyzed polyvinyl alcohol |
| 10 | Lectrapel cationic fixing agent |

EXAMPLE Z

A surface sizing agent was added to the coating composition of Example Y. Specifically, 10 parts of a styrene acrylic copolymer (MSA-150 by Morton International) per 100 parts of pigment were added to the composition. Print tests showed that the addition of the sizing agent significantly improved pigment black print quality, reducing bleeding. However, the Example Z sample had longer ink dry time than Example Y.

While the preferred embodiment of the present invention and representative examples have been shown and described, it is to be understood that various modifications and changes could be made thereto without departing from the scope of the appended claims.

What is claimed is:

1. An aqueous coating composition of an ink jet recording sheet, comprising a plurality of pigments, a binder and a cationic fixing agent, at least fifty percent by weight of said pigments comprising a non-agglomerated, silica pigment and at least ten percent by weight of said pigments comprising alumina, said coating composition having a pH value of less than 7.5 and a solids content of at least twenty five percent.

2. The aqueous coating composition of claim 1, wherein said silica pigment is a silica gel having a primary particle pore volume between 0.5 and 2.0 cc/g.

3. The aqueous coating composition of claim 1, wherein said cationic fixing agent comprises from 4 to 10 parts by weight per 100 parts of pigment.

4. The aqueous coating composition of claim 1, wherein said binder comprises about 30 to 50 parts by weight of polyvinyl alcohol per 100 parts of pigment.

5. The aqueous coating composition of claim 4, wherein said polyvinyl alcohol is low molecular weight and partially hydrolyzed.

6. An aqueous coating composition as in claim 1, wherein said binder comprises 5 to 30 parts by weight of latex per 100 parts of pigment.

7. An aqueous coating composition as in claim 1, wherein the pH value of the composition is greater than about 4.0.

8. An aqueous coating composition as in claim 1, wherein the pH value of the composition is between about 4.5 and 5.5.

9. An aqueous coating composition as in claim 1, wherein said pigment comprises about 25 percent by weight of alumina and about 75 percent by weight of silica.

10. An aqueous coating composition as in claim 1, wherein said coating composition has a solids content of about thirty-five to about thirty-eight percent.

11. An aqueous coating composition of an inkjet recording sheet as in claim 1, wherein said solids content is between about 30 and 38 percent.

12. An aqueous coating composition for an ink jet recording sheet, comprising, by bone dry weight, from about 75 to about 90 parts of a non-aggolmerated, absorptive silica gel having a primary particle pore volume between 0.5 and 2.0 cc/g, from about 10 to about 25 parts alumnina, from about 30 to about 50 parts of polyvinyl alcohol, and said coating composition having a solids content of at least 22% and a pH value between 4.0 and 7.5.

13. An aqueous coating composition as in claim 12, further comprising from 4 to 10 parts by weight per 100 parts of pigment of a cationic fixing agent.

14. An aqueous coating composition as in claim 13, wherein said cationic agent is a water soluble, polycationic quaternary ammonium.

15. An aqueous coating composition for an ink jet recording sheet, comprising, by bone dry weight, from about 75 to about 90 parts of a non-agglomerated, absorptive silica gel, from about 10 to about 25 parts alumina, from about 30 to 50 parts of polyvinyl alcohol, and from about 4 to about 10 parts cationic fixing agent, said coating composition having a pH value between 4.0 and 7.5 and a solids content of at least 25 percent.

16. An aqueous coating composition as in claim 15, further comprising about 20 parts by weight of latex per 100 parts of pigment.

17. An aqueous coating composition for an ink jet recording sheet, comprising, by dry weight, 75 to 100 parts of a non-agglomerated, absorptive silica having primary particle pore volume of 0.5–1.5 cc/g, 10 to 25 parts alumina, 30 to 50 parts of polyvinyl alcohol and about 6 to 10 parts by weight of a cationic fixing agent, said coating composition having a pH value between 4.5 and 5.5 and a solids content of at least 25 percent.

18. A method for making a coating composition, said method comprising the steps of:

selecting a plurality of pigments that when dispersed in water will have a pH value of less than 7.5, at least 50 percent by weight of the selected pigments comprising a non-agglomerated, absorptive silica having a primary particle pore volume between 0.5 and 2.0 cc/g, at least 10 percent by weight of the selected pigments comprising alumina;

dispersing 30 to 50 parts by dry weight per 100 parts of pigment of a binder in water to form an aqueous dispersion at about 10–20% solids;

adding water to a vessel so as to produce a coating composition having a solids content of between 25–45% solids;

adding an aqueous solution of a cationic fixing agent at about 35–45% solids to the vessel at a ratio of 4 to 10 parts by dry weight of cationic agent for every 100 parts by dry weight of pigment;

adding a portion of said binder solution to the vessel;

dispersing the pigment in the vessel in an amount such that the final solids content in the vessel will be at least 25%;

adding the remaining binder dispersion to the vessel; and mixing to form a coating composition.

19. A method as in claim 18, wherein the alumina pigment is dispersed in the vessel before the step of dispersing the silica pigment.

20. A method as in claim 18, further comprising the step of adding a fluorescent whitening agent at a ratio of about 2 parts wet weight of fluorescent whitening agent per 100 parts of pigment to the coating composition after the step of adding the remaining binder dispersion.

21. A method for making a coating composition as in claim 18, further comprising the step of applying the composition to a substrate with a blade coater to achieve a single application coat weight of 7 gm/m$^2$ or greater.

22. A method for making a coating composition as in claim 21, wherein said coat weight is 13 gm/m$^2$ or greater.

* * * * *

UNITED STATES PATENT AND TRADEMARK OFFICE
CERTIFICATE OF CORRECTION

PATENT NO. : 6,129,785
DATED : October 10, 2000
INVENTOR(S) : Schliesman et al.

It is certified that error appears in the above-identified patent and that said Letters Patent is hereby corrected as shown below:

Claims,
Claim 15, column 18,
Line 4, after "about 30 to", please insert -- about --.

Claim 18, column 18,
Line 36, please delete "45" and insert -- 40 -- therefor.

Signed and Sealed this

Twenty-third Day of October, 2001

Attest:

NICHOLAS P. GODICI
Attesting Officer    Acting Director of the United States Patent and Trademark Office